US010616852B2

(12) United States Patent
Cuervo et al.

(10) Patent No.: US 10,616,852 B2
(45) Date of Patent: Apr. 7, 2020

(54) REDUCING THE LOAD DUE TO REPORTING OF INFORMATION CHANGES TO A POLICY AND/OR CHARGING CONTROLLER IN A MOBILE COMMUNICATION SYSTEM (71) Applicant: Alcatel Lucent, Boulogne Billancourt (FR)

(72) Inventors: Fernando Cuervo, Ottawa (CA); Konstantin Livanos, Naperville, IL (US); Laurent Thiebaut, Nozay (FR); Bruno Landais, Lannion (FR)

(73) Assignee: Nokia Technologies Oy, Espoo (FI)

( * ) Notice: Subject to any disclaimer, the term of this patent is extended or adjusted under 35 U.S.C. 154(b) by 0 days.

(21) Appl. No.: 14/370,712

(22) PCT Filed: Jan. 3, 2013

(86) PCT No.: PCT/EP2013/050062
§ 371 (c)(1),
(2) Date: Jul. 3, 2014

(87) PCT Pub. No.: WO2013/102648
PCT Pub. Date: Jul. 11, 2013

(65) Prior Publication Data
US 2015/0005004 A1    Jan. 1, 2015

(30) Foreign Application Priority Data

Jan. 6, 2012   (EP) .................................... 12290008

(51) Int. Cl.
*H04W 24/00*      (2009.01)
*H04W 64/00*      (2009.01)
(52) U.S. Cl.
CPC ................................. *H04W 64/00* (2013.01)

(58) Field of Classification Search
CPC ..... H04W 74/002; H04W 4/005; H04W 4/08; H04W 4/001; H04W 74/0833;
(Continued)

(56) References Cited

U.S. PATENT DOCUMENTS 8,331,229 B1 * 12/2012 Hu .......................... H04L 47/805
370/230
2003/0100326 A1 * 5/2003 Grube .................... H04W 84/08
455/515

(Continued)

FOREIGN PATENT DOCUMENTS

| CN | 101272274 | 9/2008 |
| CN | 101568061 | 10/2009 |

(Continued)

OTHER PUBLICATIONS

"3rd Generation Partnership Project; Technical Specification Group Services and System Aspects; Location Services (LCS); Service description; Stage 1 (Release 10)," 3GPP TS 22.071, V10.0.0, pp. 1-52, XP050477327, (Mar. 2011).

(Continued)

*Primary Examiner* — Mahendra R Patel
(74) *Attorney, Agent, or Firm* — Fay Sharpe LLP (57) ABSTRACT

In an embodiment, there is provided a method for reducing the load due to user location change reporting for location-based policy and/or charging control services for said user, in a mobile communication system wherein granularity of user location includes granularity at cell level and/or granularity at service area level, a service area (or Location or Routing or Tracking Area) comprising a set of cells defined at network operation level, a method wherein said user location change reporting is based on at least one of:
a granularity of reporting at a base station level, whereby a user location change is reported upon change of serving base station, (Continued)

a granularity of reporting at a policy area level, whereby a user location change is reported upon entering or leaving a policy area, a policy area comprising a set of cells and/or serving areas, defined at policy and/or charging control level, for a granularity of reporting at a cell level or at a service area level or at a policy area level, a deferred user location change reporting until user plane activity is resumed, in case said user is not currently active in the user plane.

19 Claims, 4 Drawing Sheets

(58) Field of Classification Search
CPC ....... H04W 72/04; H04W 84/08; H04W 4/10; H04W 76/005; H04W 4/24; H04W 4/02; H04W 4/20; H04W 64/00; H04W 48/18; H04W 88/06; H04W 48/16; H04W 36/0005; H04W 36/12; H04W 84/04; H04W 4/021; H04Q 7/28; G06Q 10/00; G06Q 30/00; G06Q 30/0283; G06Q 50/00; G06F 21/6218; H04L 12/14; H04L 67/18; H04M 15/66; H04M 15/64
USPC ............ 455/408, 435.1, 456.1, 421; 370/229
See application file for complete search history.

(56) References Cited

U.S. PATENT DOCUMENTS

| | | | | |
|---|---|---|---|---|
| 2005/0117586 A1* | 6/2005 | Ikeda | ...................... | H04L 47/20 370/395.21 |
| 2005/0213721 A1* | 9/2005 | Hakala | ...................... | H04L 12/14 379/114.01 |
| 2007/0117558 A1* | 5/2007 | Balwani | ................ | H04W 8/245 455/421 |
| 2008/0046963 A1* | 2/2008 | Grayson | ................. | H04L 12/66 726/1 |
| 2008/0229385 A1* | 9/2008 | Feder | ...................... | H04L 12/14 726/1 |
| 2008/0256251 A1* | 10/2008 | Huotari | ................... | H04L 67/16 709/229 |
| 2009/0172155 A1* | 7/2009 | Artobello | ............ | H04L 43/0811 709/224 |
| 2009/0254494 A1* | 10/2009 | Li | ...................... | G06O 30/0283 705/400 |
| 2009/0268635 A1* | 10/2009 | Gallagher | ............... | H04W 8/08 370/254 |
| 2009/0285183 A1* | 11/2009 | Wu | ......................... | H04L 47/80 370/331 |
| 2010/0113067 A1* | 5/2010 | Fullam | ................... | H04W 4/021 455/456.3 |
| 2010/0211666 A1* | 8/2010 | Kvernvik | ............ | H04L 41/0681 709/223 |
| 2010/0254313 A1* | 10/2010 | Hallenstal | ......... | H04L 29/12311 370/328 |
| 2010/0287121 A1* | 11/2010 | Li | ...................... | G06Q 30/0283 705/400 |
| 2011/0044253 A1* | 2/2011 | Zisimopoulos | ....... | H04W 48/16 370/328 |
| 2011/0099254 A1* | 4/2011 | Vankadara | ........... | G06Q 10/107 709/221 |
| 2011/0099604 A1* | 4/2011 | Zhou | ....................... | H04L 12/14 726/1 |
| 2011/0138066 A1* | 6/2011 | Kopplin | .................. | H04L 47/10 709/228 |
| 2011/0158090 A1* | 6/2011 | Riley | ...................... | H04L 12/14 370/230 |
| 2011/0208853 A1* | 8/2011 | Castro-Castro | ......... | H04L 12/14 709/223 |
| 2011/0292893 A1* | 12/2011 | Lee | ...................... | H04W 74/002 370/329 |
| 2011/0310842 A1* | 12/2011 | Eisl | .................... | H04W 36/0072 370/331 |
| 2012/0064878 A1* | 3/2012 | Castro Castro | ......... | H04L 12/14 455/418 |
| 2012/0147767 A1* | 6/2012 | Yang | .................. | H04W 36/0044 370/252 |
| 2012/0166617 A1* | 6/2012 | Chang | ................... | H04W 76/02 709/224 |
| 2013/0114417 A1* | 5/2013 | Li | ......................... | H04W 28/04 370/242 |

FOREIGN PATENT DOCUMENTS

| | | | | |
|---|---|---|---|---|
| CN | 101568092 A | 10/2009 | | |
| CN | 101653034 | 2/2010 | | |
| CN | 102045680 A | 5/2011 | | |
| CN | 102300195 A | 12/2011 | | |
| CN | 102300263 A | 12/2011 | | |
| JP | 2000-23234 A | 1/2000 | | |
| JP | 2005-109570 A | 4/2005 | | |
| TW | I353149 B | 11/2011 | | |
| TW | I353733 B | 12/2011 | | |
| TW | I353768 B | 12/2011 | | |
| TW | I355178 B | 12/2011 | | |
| WO | WO-2008061477 A1 * | 5/2008 | ............ | H04L 12/14 |
| WO | WO-2008131695 A1 * | 11/2008 | ............ | H04L 12/14 |
| WO | 2009000313 | 12/2008 | | |
| WO | 2010136070 | 12/2010 | | |
| WO | WO-2010136070 A1 * | 12/2010 | ............ | H04L 12/14 |
| WO | WO 2010147217 A1 * | 12/2010 | ............ | H04M 15/00 |
| WO | 2011/020614 A1 | 2/2011 | | |
| WO | WO 2013030626 A1 * | 3/2013 | ............ | H04W 12/02 |

OTHER PUBLICATIONS

"3rd Generation Partnership Project; Technical Specification Group Services and System Aspects 3GPP System-Fixed Broadband Access Network Interworking; Stage 2 (Release 11)," 3GPP TS 23.139 v 1.2.0, pp. 1-71, XP050575123, (Nov. 2011).
International Search Report for PCT/EP2013/050062 dated Feb. 27, 2013.
Alcatel-Lucent, Huawei, Vodafone, Nokia Siemens Networks, Verizon, Tekelec, BB-III—Gxd Procedures for Fixed Access, SA WG2 Meeting #88 S2-115258, Nov. 17, 2011.
Huawei, Hisilicon, BB3 Architecture for WLAN, SA WG2 Meeting #87 S2-114175, Oct. 4, 2011.
Huawei, Hisilicon, Ericsson, ST-Ericsson, LG Electronics, ZTE, "BBAI TS: Network Element and Reference point", 3GPP TSG SA WG2 Meeting #85 TD S2-112770, May 20, 2011.
Ericsson, ST-Ericsson, "Policy interworking for offloaded traffic in presence of NATs", SA WG2 Meeting #88 S2-114764, Nov. 18, 2011.

* cited by examiner

REDUCING THE LOAD DUE TO REPORTING OF INFORMATION CHANGES TO A POLICY AND/OR CHARGING CONTROLLER IN A MOBILE COMMUNICATION SYSTEM

The present invention generally relates to mobile communication networks and systems.

Detailed descriptions of mobile communication networks and systems can be found in the literature, such as in particular in Technical Specifications published by standardization bodies such as for example 3GPP (3$^{rd}$ Generation Partnership Project).

In general, in a mobile communication system, a terminal (also called User Equipment UE) has access to mobile services via a mobile network (also called Public Land Mobile Network PLMN). In particular, a terminal has access to IP-based services via an IP-Connectivity Access Network (IP-CAN). An example of IP-CAN is EPS (Evolved Packet System) network, specified in particular in 3GPP TS 23.401 and 3GPP TS 23.402.

Figure 1:
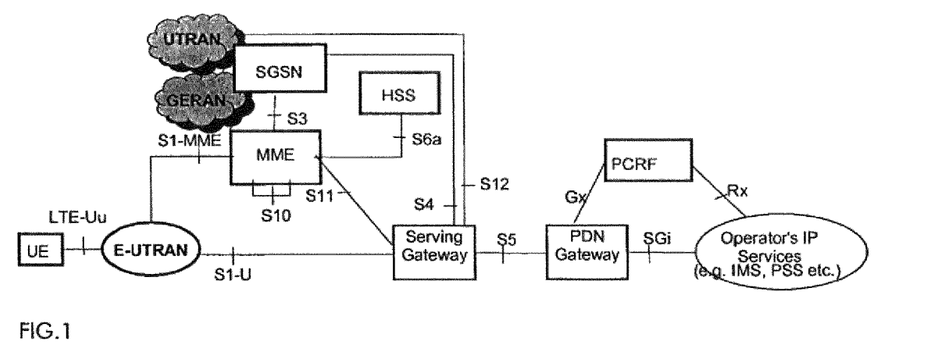
FIGS. 1 and 2 are intended to recall examples of EPS architecture.
Figure 2:
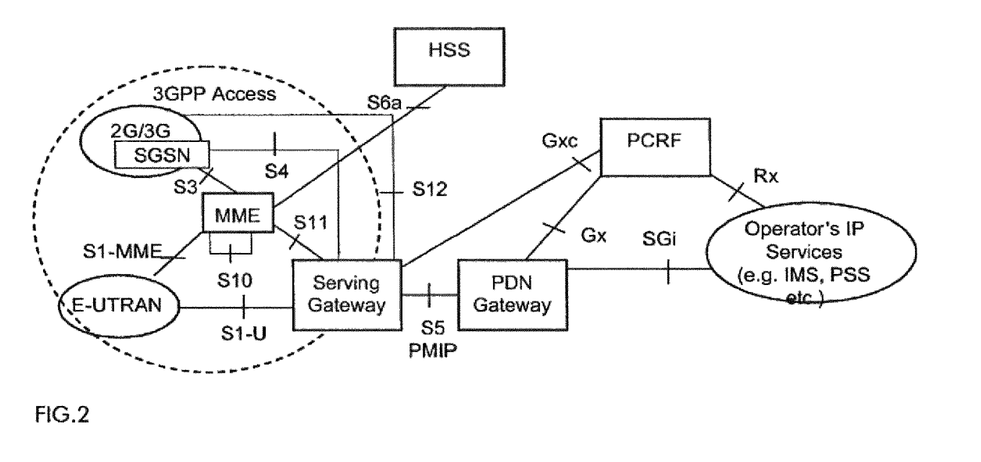

In general, a mobile network comprises a Core Network (CN) accessed by a Radio Access Network (RAN). For example, an EPS network comprises EPC (Evolved Packet Core) that can be accessed by different Radio Access Networks (such as for example E-UTRAN, UTRAN). EPC nodes include in particular: MME (Mobility Management Entity), SGW (Serving Gateway), SGSN (Serving GPRS Support Node), PGW (PDN Gateway). Interfaces within EPC network include in particular: S11 interface between MME and SGW, S4 interface between SGSN and SGW, S5/S8 interface between SGW and PGW. Examples of EPS network architectures are recalled in FIG. 1 taken from 3GPP TS 23.401 (for GTP-based S5 interface) and FIG. 2 taken from 3GPP TS 23.402 (for PMIP-based S5 interface).

Figure 3:
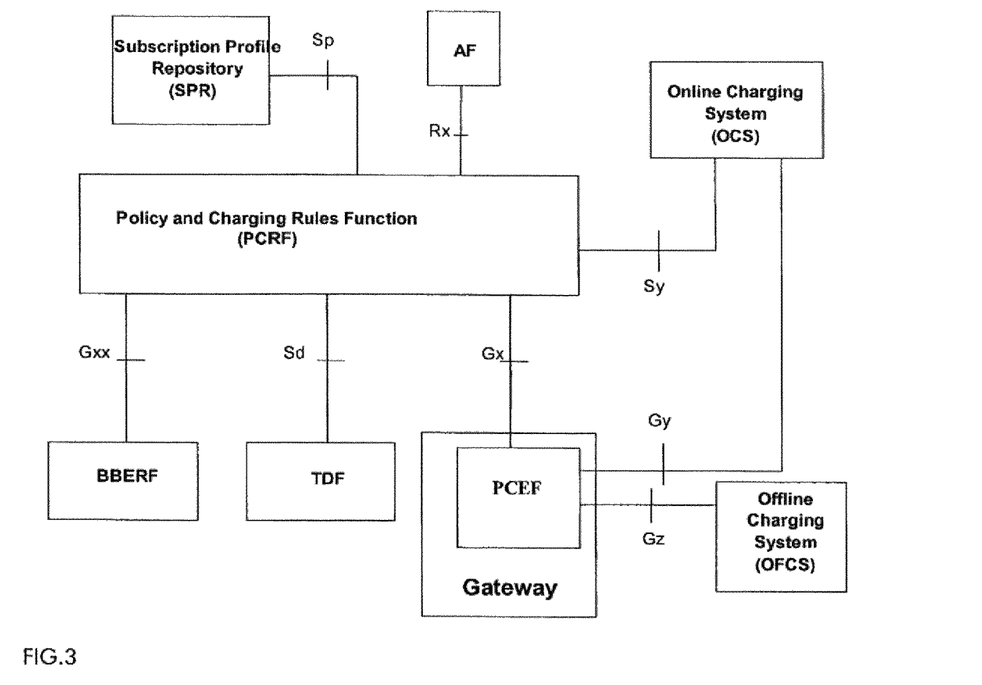
FIGS. 3 and 4 are intended to recall examples of PCC architecture.
Figure 4:
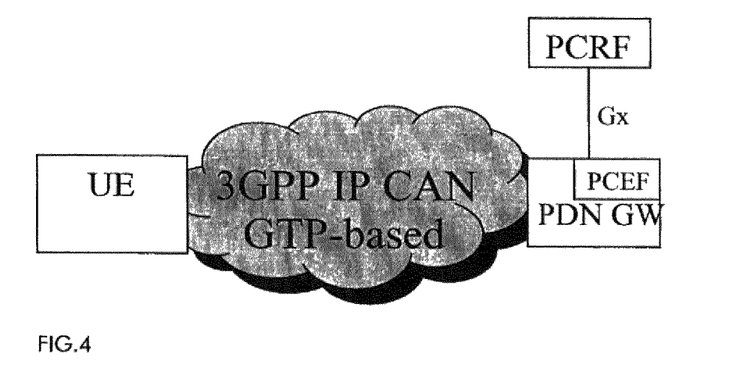

Policy and Charging Control (PCC) functionality for EPS is specified in particular in 3GPP TS 23.203. PCC functions include in particular: PCRF (Policy and Charging Rules Function), PCEF (Policy and Charging Enforcement Function), Online Charging System (OCS), SPR (Subscriber Profile Repository). Interfaces within PCC architecture include in particular: Gx interface between PCRF and PCEF (for GTP-based S5/S8 interface), Gxc interface between PCRF and SGW (for PMIP-based S5/S8 interface). An example of PCC architecture is recalled in FIG. 3 taken from 3GPP TS 23.203. FIG. 4, also taken from 3GPP TS 23.203, illustrates PCC architecture applied to an EPS IP-CAN (GTP-based).

Location change reporting procedures have been specified in such systems, in particular in 3GPP TS 29.274, whereby PCRF can subscribe to user location change notifications, and user location changes can be notified to PCRF.

Figure 5:
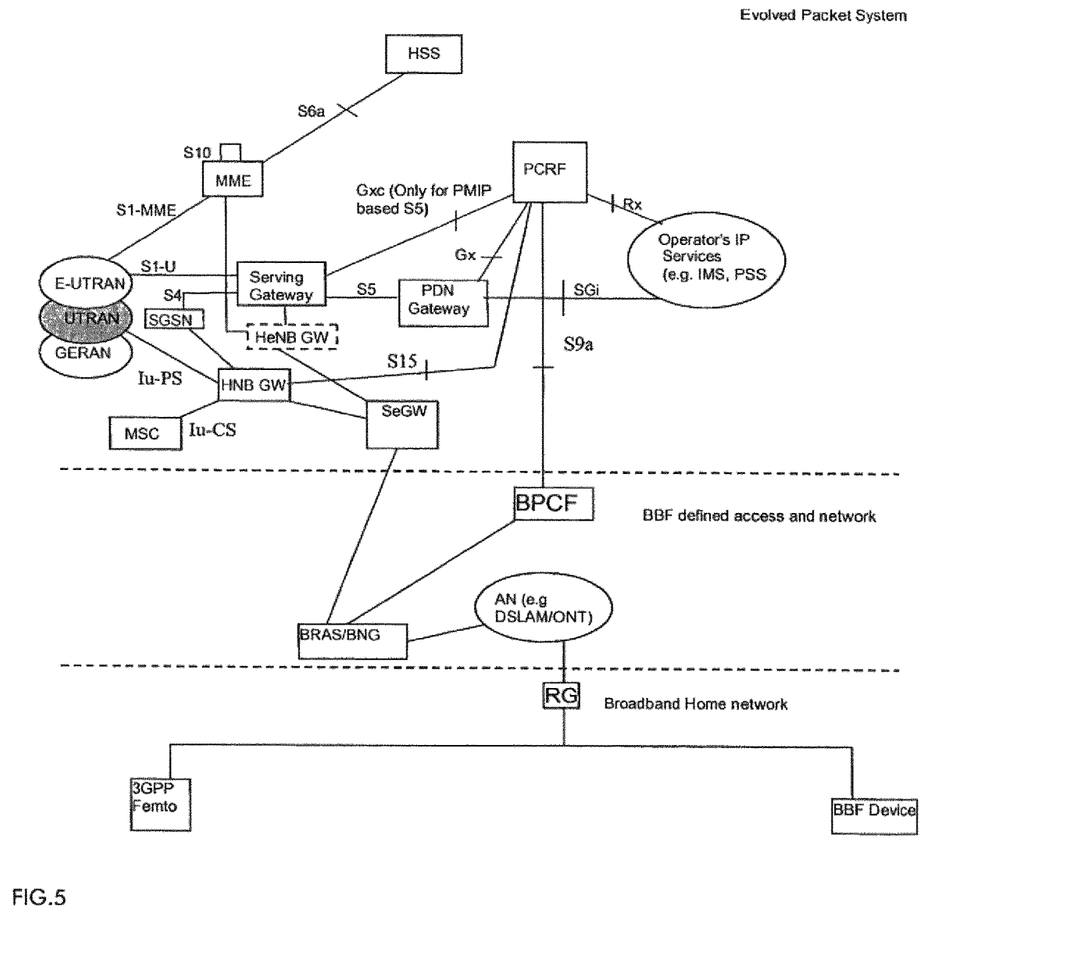
FIG. 5 is intended to recall an example of interworking architecture between a 3GPP system and a Fixed BroadBand Access Network.
Figure 6:
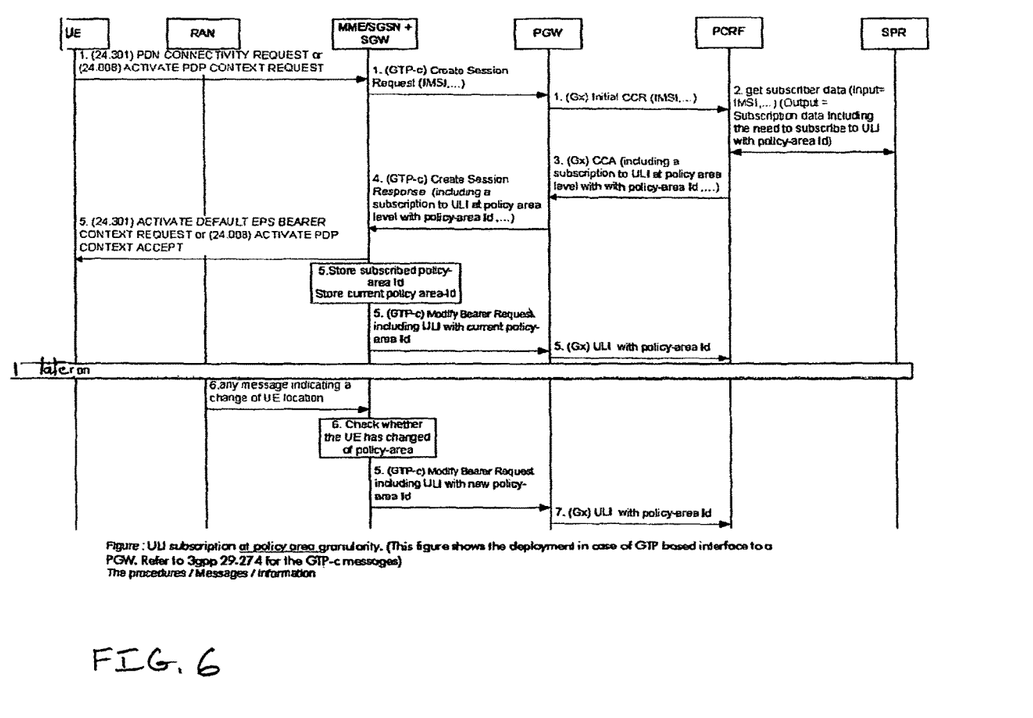
FIG. 6 is intended to illustrate an example of procedures and/or messages and/or information flows for user location change reporting, according to an embodiment of the present invention.

Interworking between EPC and Fixed Broadband Access Network is currently studied at 3GPP. Detailed descriptions of a Fixed Broadband Access Network can be found in the literature, in particular in Technical Specifications BBF TR-058, BBF TR-101, WT-134 published by Broadband Forum BBF. An example of interworking architecture enabling to provide IP connectivity to a 3GPP UE using a Home (e)NodeB H(e)NB connected to a Fixed Broadband Access Network is recalled in FIG. 5 taken from 3GPP TS 23.129. H(e)NB is a customer-premises equipment that connects a 3GPP UE over (E)-UTRAN wireless interface to a mobile operator's network using a Fixed BroadBand Access Network. In such interworking architecture, reporting procedures are also specified in 3GPP TS 23.139, whereby changes of H(e)NB local IP address, UDP port number and/or the FQDN of the Fixed Broadband Access Network are reported to the PCRF.

As recognized by the inventors and as will be explained later with more detail, there is a need to improve such reporting of information changes (such as for example user location information changes, or Fixed Broadband Access-related information changes), in particular there is a need to reduce the load due to the reporting of such information in such systems, due in particular to useless reporting in some cases.

Embodiments of the present invention in particular address such needs.

These and other objects are achieved, in one aspect, by a method for reducing the load due to user location change reporting for location-based policy and/or charging control services for said user, in a mobile communication system wherein granularity of user location includes granularity at cell level and/or granularity at service area level, a service area (or Location or Routing or Tracking Area) comprising a set of cells defined at network operation level.

In an embodiment, said user location change reporting is based on at least one of:
 a granularity of reporting at a base station level, whereby a user location change is reported upon change of serving base station,
 a granularity of reporting at a policy area level, whereby a user location change is reported upon entering or leaving a policy area, a policy area comprising a set of cells and/or service areas, defined at policy and/or charging control level,
 for a granularity of reporting at a cell level or at a service area level or at a policy area level, a deferred user location change reporting until user plane activity is resumed, in case said user is not currently active in the user plane.

Throughout this document, the term "service area" will be used as a generic term intended to cover Location Area, Routing Area, Tracking Area (the terms Location Area, Routing Area, Tracking Area having the meaning they have in the literature, in particular in 3GPP Technical Specifications). It should be noted that a thus defined "service area" is different of a "Service Area" identified by a SAI (Service Area Identifier), which is used to identify a cell in UTRAN.

These and other objects are achieved, in another aspect, by a method for reducing the load due to the reporting of BroadBand Access Interworking BBAI information changes to a policy and/or charging controller in a mobile communication system wherein a Core Network CN interworks with a Fixed BroadBand Access Network to provide IP connectivity to an User equipment UE via a Home Base Station connected to said Fixed BroadBand Access Network.

In an embodiment, said method comprises at least one of the steps of:
 said policy and/or charging controller sending towards a CN node serving said UE, referred to as serving node, a request for BBAI information change reporting,
 at least one CN node in a signalling path between said policy and/or charging controller and said serving node relaying said request towards said serving node,
 said serving node receiving said request, storing said request,
 said serving node detecting BBAI information change for said UE, reporting said BBAI information change to said policy and/or charging controller only if said serving node has received a request for BBAI information change reporting.

These and other objects are achieved, in other aspects, by entities for performing such method(s) and/or individual step(s) of such method(s), said entities including, in particular (but not exclusively): policy and/or charging controller (such as in particular PCRF for PCC functionality), subscriber profile database (such as in particular SPR for PCC functionality), and Core Network nodes (such as in particular MME/SGSN, SGW, PGW for EPS network).

Some embodiments of apparatus and/or methods in accordance with embodiments of the present invention are now described, by way of example only, and with reference to the accompanying drawings, in which.

I) In mobile networks (PLMN) the PCRF (Policy and Charging Rule function defined in 3gpp TS 23.203) and/or the OCS (On-Line Charging System) may ask to be notified with the User Location Information (ULI) changes.

The User Location Information (ULI) is defined in 3gpp 29.274 and may correspond to
  An identifier of a cell which may be:
    A CGI: Cell Global Identifier
    A SAI (3G cell Service Area Identifier)
    An E-CGI (E-UTRAN Cell Global Identifier)
  An identifier of a service area which may be:
    A RAI (Routing Area Identity)
    A TAI (Tracking Area Identity)
    A LAI (Location Area Identifier)

The CGI, SAI, RAI, TAI, ECGI and LAI identity types are defined in 3GPP TS 23.003.

This ULI change notification request is propagated to the node (MME/SGSN defined in 3gpp TS 23.401 and 23.060) interfacing the RAN (Radio Access Network) serving an UE.

In some use cases the PCRF and/or the OCS is only interested in knowing whether the UE is in a specific set of cells associated with the user subscription. This is to define suitable QoS and charging policies to apply to the data service of the user in that location.

An example is that of a Home Zone subscription where the end-user is granted a specific QoS and tariff when using the PLMN for data services within the cell or the few cells that serve(s) or surrounds the home of the user.

Embodiments of the present invention aim at reducing the signaling flow induced in the network to provide the PCRF and/or the OCS with relevant ULI when the PCRF and/or the OCS are only interested in knowing whether the UE is located in specific set of cells.

II) Besides, when ULI change notification is requested at the level of the RA (Routing Area) or TA (Tracking Area), the node serving the UE (e.g. MME, SGSN) immediately reports a change of RA/TA when the UE is in connected mode or upon a TA/RA update (per existing specifications). Immediately reporting a change of TA/RA upon a TA/RA update without the "active flag", i.e. when the UE does not have any radio and S1/Iu user plane bearers generates a lot of extra signaling and may not be necessary depending on the specific PCC service, or because the UE may anyway move subsequently to another TAI within the TAI list allocated to the UE during Mobility Management procedure (e.g. Tracking Area Accept message) without the PCRF being aware of this. Embodiments of the present invention aim at reducing the signaling flow induced in the network for reporting RA/TA changes when the PCRF and/or the OCS can accommodate deferred reporting of RA/TA changes for UEs without active radio and S1/Iu user plane bearers until such user planes are activated.

An example is that of a Home Zone subscription where
  the end-user is granted a specific QoS and tariff when using the PLMN for data services within the cell or the few cells that serve(s) or surrounds the home of the user and specific QoS and tariff for different areas while the user is away from its Home Zone. Clearly while the UE is not active notifications to the PCRF and/or the OCS of TA or RA updates of the UE are not required.

III) Besides, within the scope of the BBAI feature under definition in 3GPP Release 11 (*), new requirements have been defined in 3GPP TS 23.139 to report to the PCRF the H(e)NB local IP address (i.e. the public IP address assigned to the H(e)NB by the BBF domain if there is no NAT, or the public IP address assigned by the BBF domain to the NATed Residential Gateway (RG) that is used for this H(e)NB), the UDP port and a BBF FQDN. The BBF FQDN is used by the PCRF to derive the IP address of the BPCF (**). The H(e)NB local IP address and UDP port are subsequently sent by the PCRF to the BPCF to allow the BPCF to identity the BBF network elements the H(e)NB connects to.
  (*) Broadband Access Network Interworking, also called "3GPP System—Fixed Broadband Access Network Interworking". This new feature aims at coordinating the policy, QoS and charging applied to a user's PDN connection both in the 3GPP network and in the Broadband Access Network, when the user accesses the network via a H(e)NB or WLAN. See 3GPP TS 23.139.
  (**) Broadband Policy Control Function, i.e. equivalent in the Broadband Access Network of the PCRF of the 3GPP network The MME/SGSN are required in particular to update the PCEF/PCRF whenever the UE enters a new H(e)NB (from a source macro cell or another H(e)NB), or leaves a H(e)NB for a macro cell, or in scenarios where the UE stays under the same H(e)NB but the local H(e)NB IP address changes e.g. following a SeGW failure/H(e)NB re-registration. To do so, the MME/SGSN are expected to send a new GTP Modify Bearer Request over S11/S4 and S5/S8 (for a GTP based network, corresponding Gxc signaling for PMIP based network) reporting a change of H(e)NB local IP address, port or BBF FQDN, e.g. during Service Request and Handover scenarios (see TS 23.139 v1.2.0 clause 9.1.10). These GTP MBR and Gx/Gxx signaling can be somehow assimilated to an "ULI change reporting" of the H(e)NB local IP address, port, and BBF FQDN (as this information enables to localize the user in the BB access network).

However this new extra signaling is useless if e.g. the BBAI feature is not deployed/used e.g. not supported in the PCRF or not activated for roaming users. Embodiments of the present invention aim at reducing the signaling flow induced in the network for reporting changes of H(e)NB local IP address, port or BBF FQDN when the PCRF does not support or use BBAI for the corresponding user.

I) When the user is entitled to some location based PCC(*) services with a granularity at cell level for the location,
  (*) PCC=Policy and charging Control for data services in a PLMN, refer to 3gpp 23.203)

the PCRF determines a policy area (e.g. a list of cells) where the service has some PCC features (QoS, charging, etc. . . . ) while outside this policy area the service has other PCC features
- The determination of the policy area is likely to take into account the subscription of the user (SPR—Service policy Repository defined in 3gpp TS 23.203)
- The notion of policy area is today not defined in the standard and only a local concept with the PCRF or the OCS When the policy area is defined as a (collection) of individual cells, then the current solution relies on the PCRF and/or the OCS subscribing to any change of cell for this UE.
- an example of policy area that may be defined with a granularity at cell level is the Home Zone around the Home of the user where the user benefits from higher QoS and lower charge This subscription is propagated towards the node (e.g. MME/SGSN) interfacing the RAN serving an UE under the form of an User Location Information change request (see "Change Reporting Action" in TS 29.274) with a granularity at cell level: The MME/SGSN is to report towards the PCRF whenever "The CGI/SAI of the UE has changed" or whenever "The ECGI of the UE has changed"

Thus in this case the MME/SGSN reports towards the PCRF any change of cell for the UE This means that the PCRF and the signaling path between the PCRF and the MME/SGSN will be loaded with all the useless notifications sent to the PCRF
- When the UE moves within cells out of a policy area
- When the UE moves within cells within a policy area The notifications related with ULI change are sent:
1. when GTP applies over S5/S8 in the network: via the SGW and PGW (thus over S4/S11, S5/S8, and Gx), (as defined in 3gpp TS 23.203 and 23.401)
   - GTP is GPRS Tunneling protocol defined in 3gpp TS 29.274
2. when PMIP applies over S5/S8 in the network: via the SGW (thus over S4/S11 and Gxc) (as defined in 3gpp TS 23.203 and 23.402)

This means that SGW, PGW and PCRF may be overloaded with numerous ULI notifications that are useless (e.g. When the UE moves between cells out of a policy area)

The same issue arises for OCS requested ULI subscriptions.

II) Besides, no procedure exists in 3GPP allowing to defer the reporting of RA/TA changes for UEs without active radio and S1/Iu user plane bearers until such user planes are activated.

III) No procedure has been defined so far in 3GPP to avoid reporting changes of H(e)NB local IP address, port and BBF FQDN when the PCRF does not support or use BBAI for the corresponding user.

Four embodiments/solutions to reduce the load of useless ULI related notifications will be described in the following.
1. creating a (new) granularity of User Location Information reporting: granularity at ENB level (Evolved Node B): ULI change is only reported when the UE changes of serving ENB.
   - This is fairly limited in terms of impacts to a 3gpp system, but provides a limited improvement (any change of ENB are nevertheless reported towards the PCRF and/or OCS)
2. Providing to the node issuing the ULI related notifications (e.g. MME/SGSN) with a (new) granularity of ULI subscription: a subscription at policy area granularity. This subscription request contains the definition of the policy area, in order for this Node (e.g. MME/SGSN) to only report ULI changes when the UE moves in or out of the policy area
   - This has more impacts to a 3gpp system, but provides a high improvement (high reduction of signaling load induced by UE mobility)
3. For change reporting at cell level or at a service area level or at a policy area level, providing to the node issuing the ULI related notifications (e.g. MME/SGSN) with a new optional indication that change reporting for UEs without active radio and S1/Iu user plane bearers can be deferred until such user plane bearers are activated.
4. For BBAI information (i.e. H(e)NB local IP address, port, BBF FQDN) change reporting, providing to the node issuing the BBAI information change notifications (e.g. MME/SGSN) with a new indication to request BBAI information change reporting. BBAI information change is not reported unless requested by the PCRF.

The following solutions are deemed to be complementary to each others, each of them may be standardized and deployed independently of the others.

Proposed Solution 1:

The reporting at ENB granularity is added as an option in the ULI subscription that a PCRF or an OCS may request. ULI change is only reported when the UE changes of serving ENB.

The PCRF and/or the OCS sends via the PCEF (e.g. PGW/GGSN) towards the Node serving the UE (e.g. MME, SGSN) a ULI change reporting request telling it wants to be notified when the UE changes of serving eNodeB. This may be supported e.g. as follows:
- A new event trigger "Location Change (eNodeB)" is defined over the Gx and Gxc interface
- A new value "Start Reporting eNodeB" is defined over the S5/S8 and S11 interface in the notification of ULI change (Change Reporting Action IE (TS 29.274))

or
- a new indication associated to the existing trigger "Location Change (ECGI) telling that Location change notifications need only to be sent when the UE changes of eNodeB.

The Node serving the UE (e.g. MME) detects change of eNodeB, e.g. upon receipt of Path Switch Request or Handover Required message over the S1-AP (3gpp TS 36.413), and issues a User Location Information change reporting notification including the E-CGI cell entered in the new eNodeB.

Note: it is not foreseen to report the eNodeB identifier in the ULI information, but still an E-CGI.

Proposed Solution 2:

The reporting at the granularity of a policy area is added as an option in the ULI subscription that a PCRF or an OCS may request.

Different kinds of policy areas may be defined:
- Cell level policy areas: the policy area is defined as a collection of CGI/SAI and/or E-CGI and/or CSG cell
- Service level policy areas: the policy area is defined as a collection of LAI/RAI or TAI
- A combination of both.

An example of policy area is that of a Home Zone subscription where the Home Zone comprises the user's CSG cell+the cell id of the cells surrounding his house.

The PCRF and/or the OCS sends via the PCEF (e.g. PGW/GGSN) towards the Node serving the UE (e.g. MME, SGSN) a ULI change reporting request
  telling it wants to be notified only when the UE enters or leaves a policy area together with the definition of the policy area(s), providing for each policy area:
    an identifier of the policy area
    the list of cells (and/or LAI/RAI/TAI) making up this policy area, or
    a pointer to a policy area that is predefined in the Node serving the UE.
      Note: the pointer to a policy area may be the identifier of the policy area.

The following applies when the PCRF and/or the OCS has sent an User Location Information change subscription at the granularity of a (set of) policy area(s)

The Node serving the UE (e.g. MME, SGSN) filters the information received from the RAN (e.g. Path Switch Request or Handover Required at change of ENB) and issues a User Location Information change reporting notification only when the UE enters or leaves a policy area For an UE subject to policy area level ULI subscription,
  The Node serving the UE (e.g. MME, SGSN) sends also a User Location Information change reporting notification towards the PCEF (e.g. PGW/GGSN)
  Each time the Node serving the UE receives a (new) subscription to ULI at a policy area level if the UE is located in a policy area.
    1. This is to cope e.g. with the case where the UE would have moved in or out of the policy area between the activation of the PDN connection (IP-CAN session) and the reception of the User Location Information change subscription at the granularity of a policy area
  When ISR (Idle mode Signaling Reduction as defined in 3gpp TS 23.401) does not apply: Each time the Node serving the UE (e.g. MME, SGSN) detects that an UE becomes CONNECTED and the UE has entered a new policy area or left any policy area since the last reported ULI.
  When ISR applies, each time a Node serving an UE subject to policy area level ULI subscription detects that this UE becomes CONNECTED, this node updates the SGW with the policy area identifier associated with the current location of the UE (or with the fact the UE is in no policy area). The SGW should not propagate this status when it detects that the UE has not entered a new policy area or left any policy area since the last reported ULI:
    As per existing specifications, when the UE enters connected mode (i.e. the UE initiates a Service Request procedure), the MME/SGSN sends a GTP Modify Bearer Request to the SGW (over S11/S4) to establish the S1/Iu bearers and to update the SGW about the new RAT (Radio Access Technology) of the UE. The SGW updates the PCEF/PCRF about the new RAT if the RAT has changed.
    The MME/SGSN shall additionally include in the Modify Bearer Request message over S11/S4 the indication of whether the UE is in or out of a policy area and (if the UE is reported in a policy area) the policy area identifier. The SGW updates the PCEF/PCRF about a policy area change only when the UE has entered a new policy area or left any policy area.
  Each Time the Node starts serving the UE (e.g. at inter MME and/or inter SGSN or MME to SGSN or SGSN to MME mobility events)
  Note: Alternatively, during Inter Core Network serving node mobility (e.g. mobility between MME(s) and SGSN(s)), the old Core Network (CN) node may provide the new CN node with the current ULI change reporting request (as per existing 3gpp TS 29.274), the definition of the policy areas to be reported for this UE together with the indication of whether in the last ULI report
    The UE was reported in or out of a policy area
    (if the UE was reported in a policy area) the last reported policy area.
  With such information, the new CN node sends a ULI change reporting notification towards the PCEF only when the UE has entered a new policy area or left any policy area. This would avoid useless signaling towards the PCEF/PCRF e.g. upon inter-MME relocation when the UE has not changed of policy area.

The ULI reporting sent by the node (MME/SGSN) interfacing the RAN when an UE has entered or left a policy area contains both
  The identifier of the new policy area where the UE is now located or an indication that the UE is no more in a policy area
  The identifier of the new cell (E-CGI, CGI/SAI) where the UE is now located At Attach/PDN connection activation, together with the initial ULI, the node (MME/SGSN) interfacing the RAN indicates its support of the feature (ULI at policy area level). This information is reported up to the PCRF that can decide whether to request User Location Information change request
  at cell (or TAI/RAI) level for the nodes (MME/SGSN) interfacing the RAN that don't explicitly mention they support the feature.
  at policy area level for the nodes (MME/SGSN) interfacing the RAN that explicitly mention they support the feature at change of node (MME/SGSN) interfacing the RAN (e.g. inter MME, inter SGSN or MME-SGSN mobility) the new node (MME/SGSN) supporting the UE indicates its support of the feature (ULI at policy area level). This information is reported up to the PCRF that can decide whether to request User Location Information change request at cell (or TAI/RAI) level or at policy area level
  Note: these principles on how to report the MME/SGSN ULI capability at policy area level towards the PCEF/PCRF are similar to those currently specified on how the MME/SGSN reports support of Location Change Reporting or CSG change reporting (see the "CSG Change Reporting support indication" and "Change Reporting support indication" flags in 3gpp TS 29.274).

Since this feature also slightly impacts the SGW and PGW (the latter for GTP-based S5/S8 networks only)—limited protocol changes, the information reported to the PCRF for the PDN connection needs also to take into account whether the SGW and PGW supports this feature. An SGW or PGW not supporting this feature e.g. legacy GW) will not relay the information received from the MME/SGSN indicating support of that feature. Change to the support of that feature during an SGW relocation (e.g. when the feature is supported by the old SGW but not the new one, corner case) will also be signaled, e.g. within the Modify Bearer Request message sent over S5/S8 during the SGW relocation.

This mechanism is mostly suited for the non roaming case. In case of roaming it is doubtful that the PCRF in the Home PLMN would have an appropriate knowledge of the VPLMN deployment in order to provide the policy area.
- Especially in international roaming, it is assumed that the PCRF in the HPLMN does not need to know ULI at a granularity of cells or even TA/LA.
- In current specifications where the ULI is reported to the PCRF of the HPLMN with indications of LAI/RAI/TAI/E-CGI/CGI/ . . . there is already the need to co-ordinate between the HPLMN and the VPLMN about the relationship between these identifiers and geographical co-ordinates
- In RAN sharing MOCN (refer to 3gpp TS 23.251) deployments, the RAN is shared but the node (e.g. MME/SGSN) interfacing the RAN is not shared and is owned by the same operator than the PCRF. Thus the identifiers of the policy area may be configured by co-operative management between the PCRF and the nodes (e.g. MME/SGSN) interfacing the RAN
- It is unlikely that pre-configured policy areas identifiers would be used in GWCN RAN sharing (refer to 3gpp TS 23.251) deployments.

To avoid too much complexity and limit the amount of policy area information to be stored in the MME/SGSN,
- a maximum value of the number of policy areas the PCRF may ask to track for a given IP-CAN session should be defined in (3gpp) standards
- the PCRF (or its management system) is responsible to make sure that different policy areas are non overlapping.
- the PCRF controlling a PDN connection of an UE may provide subscription to ULI change with a set of policy areas, while the PCRF Controlling another PDN connection of this UE may provide subscription to ULI change with another set of policy.

An example of call flow using this solution (in a network where GTP is deployed between a SGW and a PGW) for PCRF requested User Location Information reporting at the granularity of a cell-level policy area.

1. A PDN connection (IP-CAN session) is activated for an UE over a MME/SGSN (this may be e.g. as part of an UE ATTACH or as part of a UE requested PDN connection activation or as part of an ACTIVATE PDP CONTEXT REQUEST). A GTP Create Session Request is sent to the PGW that notifies the PCRF over Gx with an Initial CCR message (indicating the new IP-CAN session for the UE, with the UE identity, its IP addressing information and its location)
2. The PCRF looks-up the SPR (Subscriber Profile Repository) to get the subscription data and determines the policy rules for the IP-CAN session
    the policy area for the UE and the need to subscribe to ULI with a granularity of a policy area
3. The PCRF answers to the PGW over Gx (CCA message) with
    the policy rules for the IP-CAN session
    a Subscription to ULI at cell-level policy area granularity together with
    a. the policy area identifier
    b. the definition of the cell-level policy area: list of cell identifiers (E-CGI or CGI/SAI) building the cell-level policy area or pointer to a predefined policy area
4. This is reported back to the MME/SGSN by the PGW
    i. via the SGW (thus over S5/S8 and S4/S11), using e.g. the Change Reporting Action IE of the Create Session Response GTP-c message
5. The MME/SGSN answers to the UE (e.g. ACTIVATE DEFAULT EPS BEARER CONTEXT REQUEST, ACTIVATE PDP CONTEXT ACCEPT) and upon reception from the PGW of an ULI Subscription at cell-level policy area granularity
    Stores the policy area identifier together with the definition of the cell-level policy area (list of cell identifiers building the cell-level policy area or pointer to a predefined policy area)
    If the UE is in a policy area, Sends a first ULI notification (indicating the UE is located in a policy-area and, providing the identity of the initial policy-area of the UE) towards the PGW that forwards this information to the PCRF
        The PCRF assumes that the UE is not in a policy area when it requests an ULI Subscription at cell-level policy area granularity
6. Each time the MME/SGSN is made aware of a change of the UE location, it checks whether this is a change that makes the UE move in or out of a policy area.
7. When the change of the UE location corresponds to a change that makes the UE move in or out of a policy area, the MME/SGSN sends an ULI change notification towards the PCEF (PGW/GGSN): a GTP Modify Bearer Request is sent together with the ULI. This ULI change notification contains:
    a. The identifier of the new policy area where the UE is now located or an indication that the UE is no more in a policy area
    b. The identifier of the new cell (E-CGI, CGI/SAI) where the UE is now located Proposed Solution 3:

For change reporting at cell level or at a service area level or at a policy area level, a new option is added to allow the PCRF to instruct the Node serving the UE (e.g. MME, SGSN) to defer change notifications for UEs without active radio and S1/Iu user plane bearers until such user plane bearers are activated.
    The PCRF and/or the OCS sends via the PCEF (e.g. PGW/GGSN) towards the Node serving the UE (e.g. MME, SGSN) a ULI change reporting request e.g. for RA/TA change with a new optional indication allowing deferred reporting of these e.g. RA/TA changes for UEs without active radio and S1/Iu user plane bearers until such user plane bearers are activated.
    The new option is signalled over the S5/S8 and S11 interface in the Change Reporting Action IE (TS 29.274).
    Upon a TA/RA update procedure without the "active flag" or "follow-on" flag (see TS 23.401 and TS 23.060), i.e. when the UE does not have any radio and S1/Iu user plane bearers, the Node serving the UE (e.g. MME or SGSN) that detects a change of RA/TAx, does NOT immediately issue a User Location Information change reporting notification, but defers such notification until the next Service Request procedure (see TS 23.401 & 23.060) i.e. when radio and S1/Iu user plane bearers are setup. If the next Service Request is performed in the same TA/RA as last reported to the PCRF, no ULI change notification is sent at all.

Note: the solution 3 may also be applied to the solution 2 to allow the PCRF to request immediate or deferred reporting of change of policy area for a UE without active radio and S1/Iu user plane bearers.

Proposed Solution 4:

For BBAI information (i.e. H(e)NB local IP address, port, BBF FQDN), a new option is added to allow the PCRF to instruct the Node serving the UE (e.g. MME, SGSN) to report BBAI information changes.

The PCRF sends via the PCEF (e.g. PGW/GGSN) towards the Node serving the UE (e.g. MME, SGSN) a request for BBAI information change reporting.

The request is signaled over the Gx/Gxx, S5/S8 and S11/S4 interface e.g. via a new value in the Change Reporting Action IE (TS 29.274).

The Node serving the UE (e.g. MME, SGSN) checks the H(e)NB local IP address, port, BBF FQDN received from the RAN (S1/Iu interface) and issues a BBAI Information change reporting notification when detecting a change in any of the BBAI parameters only if BBAI change notification was requested by the PCRF.

If the Node serving the UE (e.g. MME, SGSN), the SGW or the PGW does not support BBAI change reporting, it does not relay and ignores the PCRF request and does not report any BBAI change. BBAI is not possible in that scenario.

during Inter Core Network serving node mobility (e.g. mobility between MME(s) and SGSN(s)), the old Core Network (CN) node may provide the new CN node with the BBAI change reporting request to allow the new CN node to continue monitoring and reporting change of BBAI information if such request had been received by the old CN node.

The SGW may also store the current BBAI information of the user to be able to include the current BBAI parameters in any GTP Modify Bearer Request sent over the S5/S8 (or corresponding Gxx signaling) e.g. in MBR messages sent over S5/S8 for reasons other than BBAI information change reporting. The SGW may also use these stored BBAI information to check upon an Inter-CN node Intra-SGW mobility whether the BBAI information provided by the new CN node over the S11/S4 interface have changed or not wrt the last BBAI values reported to the PCRF, and so to determine whether the PCRF needs to be updated or not with new BBAI information.

In one aspect, there is provided a method for reducing the load due to user location change reporting for location-based policy and/or charging control services for said user, in a mobile communication system wherein granularity of user location includes granularity at cell level and/or granularity at service area level, a service area (or Location or Routing or Tracking Area) comprising a set of cells defined at network operation level.

In an embodiment, said user location change reporting is based on at least one of:

a granularity of reporting at a base station level, whereby a user location change is reported upon change of serving base station, a granularity of reporting at a policy area level, whereby a user location change is reported upon entering or leaving a policy area, a policy area comprising a set of cells and/or service areas, defined at policy and/or charging control level, for a granularity of reporting at a cell level or at a service area level or at a policy area level, a deferred user location change reporting until user plane activity is resumed, in case said user is not currently active in the user plane.

In an embodiment, said method comprises at least one of the steps of, for a granularity of reporting at base station level:

a policy and/or charging controller issuing a request for subscription to user location change notifications, said subscription request indicating a granularity at base station level, possibly one network node in a signalling path between said policy and/or charging controller and a network node handling subscriptions to user location change notifications for said user, referred to as serving node, relaying said request towards said serving node, said serving node issuing a notification of user location change, in case of change of serving base station for said user.

In an embodiment, said method comprises at least one of the steps of, for a granularity of reporting at policy area level:

a policy and/or charging controller issuing a request for subscription to user location change notifications, said subscription request indicating a granularity at policy area level and containing policy area related information, possibly one network node in a signalling path between said policy and/or charging controller and a network node handling subscriptions to user location change notifications at policy area level for said user and referred to as serving node at policy area level, relaying said request towards said serving node at policy area level, a serving node at policy area level storing policy area related information received in a request for subscription to user location change notifications, a serving node at policy area level issuing user location change notifications at policy area level, in at least one of following occurrences:

if the serving node at policy area level detects that the User Equipment UE has entered or left a policy area, when the serving node at policy area level receives a new request for subscription to user location change notifications at policy area level, when the serving node at policy-area level starts serving the UE, a network node in a signalling path between said serving node at policy area level and said policy and/or charging controller, relaying said notification of user location change at policy area level towards said policy and/or charging controller.

In an embodiment, said method comprises at least one of the steps of, for a granularity of reporting at policy area level:

a serving node at policy area level issuing user location change notifications at policy area level, in at least one of following occurrences:

when the UE attaches to the network or activates a connection, only if the serving node at policy area level detects that the UE is in a policy area, when the UE transitions from idle mode to connected mode, only if the serving node at policy area level can detect that the UE has entered a new policy area or left any policy area since the last reported user location, In an embodiment, said method comprises at least one of the steps of, for a granularity of reporting at policy area level:
- a network node handling subscriptions to user location change notifications at policy area level for said user, referred to as serving node at policy area level, having received a request for subscription to user location change notifications at policy area level, forwarding a request for subscription to user location notifications at cell or service area level, depending on whether said policy area comprises a set of cells or a set of service areas, to a network node handling subscriptions to user location change notifications at cell or service area level for said user, referred to as serving node at cell or service area level,
- said serving node at policy area level filtering user location change notifications at cell or service area level received from said serving node at cell or service area level, to detect if the user has entered or left a policy area.

In an embodiment, said method comprises at least one of the steps of, when an User Equipment UE attaches to the network or activates a connection:
- a network node handling subscriptions to user location change notifications for said user, referred to as serving node, indicating to a policy and/or charging controller if it supports said user location reporting at policy area level,
- said policy and/or charging controller deciding to subscribe to user location change notifications at cell and/or service area level if said serving network node does not support said user location reporting at policy area level, or at policy area level if said serving node supports said user location reporting at policy area level.

In an embodiment, said method comprises at least one of the steps of, at change of network node handling subscriptions to user location change notifications for said user, referred to as serving node:
- a new serving node indicating if it supports said user location reporting at policy area level,
- said support being reported to a policy and/or charging controller,
- said policy and/or charging controller deciding to subscribe to user location change notifications, at cell and/or service area level, depending on whether said policy area comprises a set of cells or a set of service areas, if said new serving node does not support said user location reporting at policy area level, or at policy area level if said new serving node supports said user location reporting at policy area level.

In an embodiment, said method comprises at least one of the steps of, at change of network node handling subscriptions to user location change notifications at policy area level for said user, referred to as serving node at policy area level:
- a new serving node at policy area level retrieving from an old serving node at policy area level, policy-area related context information stored in said old policy-area level serving node.

In an embodiment, said method comprises at least one of the steps of, for an EPS network, for a network node handling subscriptions to user location change notifications at policy area level for said user, referred to as serving node at policy area level, corresponding to a serving MME or SGSN, and when ISR applies:
- a first node MME or SGSN serving the UE and connected to a SGW serving the UE sending to said SGW information as to the current policy area for the UE,
- said SGW storing said information as to the current policy area for the UE,
- another node SGSN or MME serving the UE and connected to said SGW sending to said SGW information as to a new policy area for said UE,
- said SGW determining whether the UE has actually entered or left a policy area by comparing said information as to new and current policy area and transferring a notification towards the policy and/or charging controller having issued a request for subscription only if it detects the policy area status of the UE has changed (the UE has entered or left a policy area).

In an embodiment, said method comprises at least one of the steps of, for an EPS network and PCC services:
- a PCRF issuing a request for subscription to User Location Information change notification at eNodeB level,
- a serving PGW and/or a serving SGW forwarding said request,
- a serving MME having received said request, and detecting a change of serving eNodeB for said user, issuing a notification of User Location Information change, including as User Location Information a cell identity E-CGI where the UE is located and belonging to the new serving eNodeB.

In an embodiment, said method comprises at least one of the steps of, for an EPS network and PCC services:
- a SPR sending to a PCRF subscriber data including a need to subscribe to User Location Information ULI with a granularity of a policy area, together with policy area-related information,
- a PCRF issuing a request for subscription to User Location Information change notification at policy area level, including policy area-related information
- a serving PGW and/or a serving SGW forwarding said request,
- a serving MME or SGSN or SGW receiving said request, storing said policy area related information,
- said serving MME or SGSN or SGW having received said request, and detecting a need to issue a notification of User Location Information change at policy area level, issuing said notification, including as User Location Information a new policy area where the UE is now located or an indication that the UE is no more in a policy area,
- a serving SGW and/or a serving PGW forwarding said notification to said PCRF.

In an embodiment, said method comprises at least one of the steps of, for deferred user location change reporting until user plane activity is resumed, in case said user is not currently active in the user plane, and for a granularity of reporting at a cell level or at a service area level or at a policy area level:
- a policy and/or charging controller sending a request for subscription to user location change notifications, said request including an indication that said deferred reporting is allowed,
- a network node in a signalling path between said policy and/or charging controller and a network node handling subscriptions to user location change notifications at a cell level or at a service area level or at policy area level for said user and referred to as serving node at cell or service area or policy area level, relaying said request towards said serving node at cell or service or at policy area level, said serving node at cell or service or policy area level, deferring the issuing of a notification of user location change until user plane activity is resumed, in case said user is not currently active in the user plane In another aspect, there is provided a method for reducing the load due to the reporting of BroadBand Access Interworking BBAI information changes to a policy and/or charging controller in a mobile communication system wherein a Core Network CN interworks with a Fixed BroadBand Access Network to provide IP connectivity to an User equipment UE via a Home Base Station connected to said Fixed BroadBand Access Network.

In an embodiment, said method comprises at least one of the steps of:

said policy and/or charging controller sending towards a CN node serving said UE, referred to as serving node, a request for BBAI information change reporting, at least one CN node in a signalling path between said policy and/or charging controller and said serving node relaying said request towards said serving node, said serving node receiving said request, storing said request, said serving node detecting BBAI information change for said UE, reporting said BBAI information change to said policy and/or charging controller only if said serving node has received a request for BBAI information change reporting.

In an embodiment, said method comprises a step of:

during inter-serving node mobility, an old serving node providing a new serving node with a BBAI change reporting request received by said old serving node to allow said new serving node to continue monitoring and reporting change of BBAI information.

In an embodiment, said method comprises a step of, for a Core Network corresponding to EPC, and for as serving node corresponding to a serving MME or SGSN, and:

a serving SGW storing current BBAI information to check, upon an Inter-serving node Intra-SGW mobility, whether the BBAI information provided by a new serving node has changed or not compared to the last BBAI information reported to the PCRF, and so to determine whether the PCRF needs to be updated or not with new BBAI information;

a PCRF issuing a request for subscription to BBAI information change reporting.

Other aspects relate to entities configured for performing such method(s) and/or individual step(s) of such method(s), said entities including, in particular (but not exclusively): policy and/or charging controller (such as in particular PCRF for PCC functionality), subscriber profile database (such as in particular SPR for PCC functionality), and Core Network nodes (such as in particular MME/SGSN, SGW, PGW for EPS network).

A person of skill in the art would readily recognize that steps of various above-described methods can be performed by programmed computers. Herein, some embodiments are also intended to cover program storage devices, e.g., digital data storage media, which are machine or computer readable and encode machine-executable or computer-executable programs of instructions, wherein said instructions perform some or all of the steps of said above-described methods. The program storage devices may be, e.g., digital memories, magnetic storage media such as a magnetic disks and magnetic tapes, hard drives, or optically readable digital data storage media. The embodiments are also intended to cover computers programmed to perform said steps of the above-described methods.

The invention claimed is:

1. A method, comprising:

sending, a request to report whether a user equipment has entered or left a policy area, wherein the policy area is defined for policy and/or charging control services for said user; and receiving a report whether said user equipment has entered or left the policy area;

wherein said request to report whether said user equipment has entered or left said policy area comprises a request towards a core network entity having mobility management functions serving said user equipment, said request containing one of: a definition of said policy area, and a pointer pointing to said policy area predefined in said core network entity.

2. The method according to claim 1, wherein:

the request to report whether said user equipment has entered or left said policy area contains a policy area identifier.

3. The method according to claim 2, wherein:

said policy area identifier comprises said pointer pointing to said policy area predefined in said core network entity.

4. The method according to claim 1, wherein:

the report whether said user equipment has entered or left said policy area contains a policy area identifier.

5. An apparatus, comprising:

at least one processor; and at least one memory including computer program code;

the at least one memory and the computer program code configured to, with the at least one processor, cause the apparatus at least to perform:

sending a request to report whether a user equipment has entered or left a policy area, wherein the policy area is defined for policy and/or charging control services for said user; and receiving a report whether the user equipment has entered or left said policy area;

wherein said request to report whether said user equipment has entered or left said policy area comprises a request towards a core network entity having mobility management functions serving said user equipment, said request containing one of: a definition of said policy area, and a pointer pointing to said policy area predefined in said core network entity.

6. The apparatus according to claim 5, wherein:

the request to report whether said user equipment has entered or left said policy area contains a policy area identifier.

7. The apparatus according to claim 6, wherein:

said policy area identifier comprises said pointer pointing to said policy area predefined in said core network entity.

8. The apparatus according to claim 5, wherein:

the report whether said user equipment has entered or left said policy area contains a policy area identifier.

9. An apparatus, comprising:

at least one processor; and at least one memory including computer program code;

the at least one memory and the computer program code configured to, with the at least one processor, cause the apparatus at least to perform:

receiving a request to report whether a user equipment has entered or left a policy area, wherein the policy area is defined for policy and/or charging control services for said user; and sending a report whether said user equipment has entered or left said policy area;

wherein said request to report whether said user equipment has entered or left said policy area comprises a request towards a core network entity having mobility management functions serving said user equipment, said request containing one of: a definition of said policy area, and a pointer pointing to said policy area predefined in said core network entity.

10. The apparatus according to claim 9, wherein:

the request to report whether said user equipment has entered or left said policy area contains a policy area identifier.

11. The apparatus according to claim 10, wherein:

said policy area identifier comprises said pointer pointing to said policy area predefined in said core network entity.

12. The apparatus according to claim 9, wherein:

the report whether said user equipment has entered or left said policy area contains a policy area identifier.

13. A method, comprising:

receiving a request to report whether a user equipment has entered or left a policy area, wherein the policy area is defined for policy and/or charging control services for said user; and sending a report whether said user equipment has entered or left the policy area;

wherein said request to report whether said user equipment has entered or left said policy area comprises a request towards a core network entity having mobility management functions serving said user equipment, said request containing one of: a definition of said policy area, and a pointer pointing to said policy area predefined in said core network entity.

14. The method according to claim 13, wherein:

the request to report whether said user equipment has entered or left said policy area contains a policy area identifier.

15. The method according to claim 13, wherein:

said policy area identifier comprises said pointer pointing to said policy area predefined in said core network entity.

16. The method according to claim 13, wherein:

the report whether said user equipment has entered or left said policy area contains a policy area identifier.

17. The apparatus according to claim 5, wherein:

said apparatus comprises a policy and/or charging controller.

18. The apparatus according to claim 9, wherein:

said apparatus comprises a core network entity.

19. The apparatus according to claim 9, wherein:

said apparatus comprises a core network entity having mobility management functions.

* * * * *